United States Patent
Micheron et al.

[11] 3,892,465
[45] July 1, 1975

[54] HOLOGRAPHIC SYSTEMS FOR RECORDING AND READING OUT REFRACTIVE INDEX GRATINGS WITHIN THE BODY OF A PHOTOSENSITIVE ELECTRO-OPTICAL MATERIAL

[75] Inventors: Francois Micheron; Guy Bismuth, both of Paris, France

[73] Assignee: Thomson-CSF S.C.P.I., Paris, France

[22] Filed: Sept. 7, 1973

[21] Appl. No.: 395,079

[30] Foreign Application Priority Data
Sept. 8, 1972 France.............................. 72.31873

[52] U.S. Cl. ............ 350/3.5; 340/173 LT; 350/150
[51] Int. Cl. ........................................ G02b 27/00
[58] Field of Search .......... 350/3.5, 150; 340/173.2, 340/173 LT, 173 LS

[56] References Cited
UNITED STATES PATENTS
3,643,233  2/1972  Fan et al.......................... 340/173.2
3,652,145  3/1972  Thaxter................................ 350/3.5

OTHER PUBLICATIONS
Thaxter, *Applied Physics Letters*, Vol. 15, No. 7, Oct., 1969, pp. 210–212.
Ashkin et al., *Applied Physics Letters*, Vol. 9, No. 1, July, 1966, pp. 72–74.

*Primary Examiner*—Ronald J. Stern
*Attorney, Agent, or Firm*—Cushman, Darby and Cushman

[57] ABSTRACT

The present invention, in order to increase the optical efficiency of holograms recorded in the body of a photosensitive electro-optical material in the form of a refractive index grating, exploits the existance, under special conditions of operation of ferro-electric materials, of non-linear relationships between the double refraction and the electric field. To this end, electric fields of different value are applied to the ferro-electric material during the recording and read-out phases. The invention applies to large capacity optical stores and also has applications in coherent optical systems employing holographic lenses.

6 Claims, 5 Drawing Figures

HOLOGRAPHIC SYSTEMS FOR RECORDING AND READING OUT REFRACTIVE INDEX GRATINGS WITHIN THE BODY OF A PHOTOSENSITIVE ELECTRO-OPPTICAL MATERIAL

The present invention relates to systems for the recording of three-dimensional interference fringes in the form of variations in an optical characteristic within the volume of a material, in order thus to create a hologram and to subsequently reconstitute the image which has been used to form said hologram.

More particularly, the invention pertains to systems in which said optical characteristic is the double-refracting property of a photosensitive electro-optical material.

The significance of systems of this kind resides in the fact that the thus recorded fringes constitute a three-dimensional diffraction grating which, at the time of reconstitution of the image, has an optical efficiency which can be higher than the efficiency of conventional two-dimensional recordings.

In addition, the image being stored within the volume of the material, the stored information density can be considerably increased.

To record the system of fringes in a plate of electro-optical material, generally use is made of the presence of an electric field within the body of the plate, the latter being subsequently utilised in the same electrical state at the time of reconstitution of the image.

Unfortunately, the variations in double refraction thus produced under the influence of the light radiation, are small and it is necessary to apply strong electric fields if adequate optical efficiency is to be achieved.

The object of the invention is to exploit the existence, under certain conditions of use of the material, of non-linear relationships between the double-refraction phenomenon and the focal electric field created within the body of the material, in order to increase the optical efficiency of the fringes recorded, by applying to the plate, at the time of read-out, an electric field having a different value from that utilised at the time of recording.

According to the present invention, there is provided a holographic system for recording and reading out, within the volume of a photosensitive electro-optical material, an optical grating; said optical grating being constituted by refractive index variations of said material and presenting an electrically variable optical efficiency; the operation of said system including a recording phase and a read-out phase and said system comprising:

optical means for producing, during said recording phase, photo-excitation of said material by at least one interference fringes pattern and for illuminating, during said read-out phase, said material by a monochromatic light beam;

bias means for applying a variable electric D.C. field within said material;

said material exhibiting a non-linear relationship between the values of its double-refracting property and of the local electric field;

said variable electric field controlling said refractive index variations and having one recording value during said recording phase and at least one read-out value during said read-out phase.

For a better understanding of the present invention, and to show how the same may be carried into effect, reference will be made to the ensuing description and the attached drawings, among which:

Figure 1:
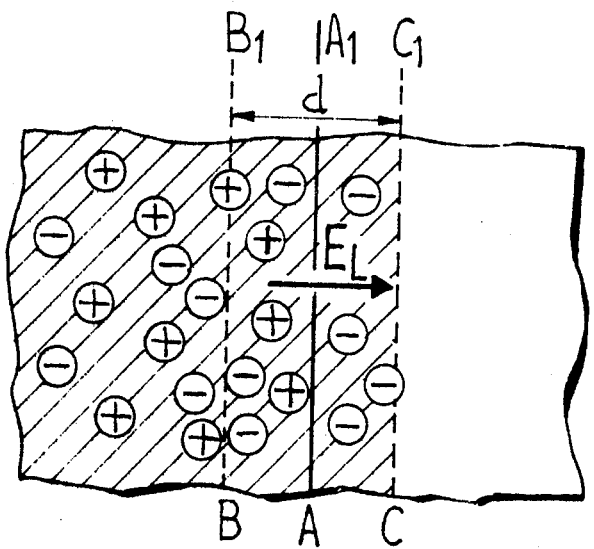
FIG. 1 is an explanatory diagram showing the process of recording interference fringes in a photosensitive electro-optical material.

FIG. 1 illustrates the process by which a network of interference fringes can be recorded in a photosensitive electro-optical material, in the form of local variations of refractive index. It illustrates a plane section through such a material, in which the left hand cross hatched part, is illuminated, whilst the right hand part receives no illumination, the straight line $AA_1$ marking the separation between the two zones.

The photosensitivity of the material is associated with the presence within it of donor and acceptor centres. The donor centres, for example, will be assumed to be photoexcitable; under the impact of sufficiently high energy photons, they turn into fixed positive charges and release mobile electrons which diffuse into the interior of the solid until they encounter acceptor centres thus creating fixed negative charges.

In regions of uniform illumination, each positive centre is thus compensated by a negative centre and the variation in the internal electric field is zero. The same applies, of course, in the non-illuminated region, where no positive centre is created. By contrast, in the central region, in the neighbourhood of the line of discontinuity $AA_1$ of the illumination, electrons, created in the illuminated zone, will leave behind them positive centres in order to enter the dark zone and then create negative centres. Thus, two zones are created, one located between the straight lines $AA_1$ and $BB_1$ in which can be found uncompensated positive charges, and the other located between the straight lines $AA_1$ and $CC_1$ in which only negative charges exist, between which there establishes a local electric field $E_l$. The distance d between the straight lines $BB_1$ and $CC_1$ is associated with the diffusion length of the charge carriers within the body of the material. Because of the electro-optical character of the material, the variation in the local electric field results in the appearance at either side of the illumination discontinuity, of a variation in the double-refracting property.

As this simple example shows, such electro-optical materials are only sensitive to spatial variations in illumination. Although they are incapable of the recording of patterns comprising extensive areas of uniform illumination, they are, on the other hand, particularly well fit to the recording of interference fringes constituting holograms.

In the majority of photosensitive electro-optical materials thus far known, the mobility of the charge carriers is very low and their diffusion, under the action of thermal agitation, extremely restricted. Thus, in order to increase the sensitivity to illumination, it is known to subject the material to a local electric field which produces migration of the charge carriers created by photo-ionisation. In contrast to thermal diffusion, which is generally isotropic in nature, this migration takes place in a direction parallel to that of the field; it is therefore necessary that the latter should be substantially perpendicular to the mean direction of the interference fringes which it is proposed to record.

Figure 2:
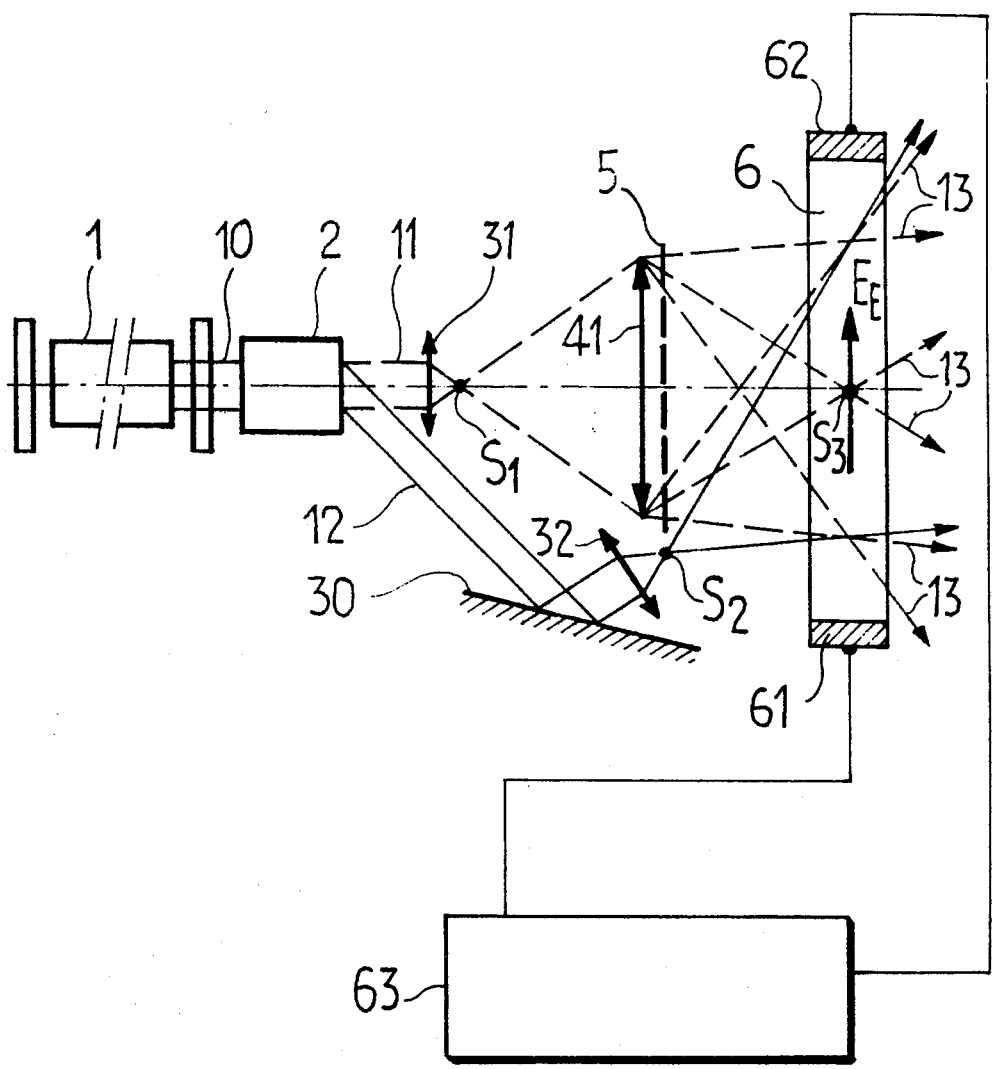
FIG. 2 illustrates a holographic recording system and read-out system, in accordance with the invention.

FIG. 2 shows an holographic recording system according with the invention. By means of this system, the hologram of an object can be recorded within an electro-optical material, and an image of the object can be subsequently reconstructed from the recorded hologram.

This system comprises optical means by which to create from the object, the network of interference fringes whose recording constitutes the halogram; it also comprises means for recording this network of fringes.

The optical means comprise a source 1 of coherent radiation emitting a parallel light beam 10 split by the beam-splitter 2 into two parallel beams 11 and 12. The beam 11, known as the object beam, is focused at a point $S_2$ by the objective lens 31, the emergent spherical wave from $S_1$ encounters a second objective lens 41 which produces an image $S_3$ of $S_1$. The beam 12, referred to as the reference beam, is deflected by the mirror 30, and focused at a point $S_2$ by the objective lens 32. In the neighbourhood of the objective lens 41, the object whose hologram is to be recorded is arranged, for example a plate 5 of non-uniform transparency. This plate diffracts the radiation passing across the lens 41, in the form of a plurality of beams converging in a same plane, which is the plane where $S_3$ is located. The radiation thus diffracted by the object 5 interferes with the spherical reference wave emanating from $S_2$, in order, within the volume surrounding the point $S_3$, to form a network of interference fringes whose disposition is characteristic of the object 5.

To proceed to the volumetric recording of these fringes and thus to constitute the three-dimensional hologram of the object 5, a plate 6 of electro-optical material, sensitive to the radiation emitted by the source 1, is arranged in the interference zone in the neighbourhood of the point 3. This plate comprises two electrodes 61, 62 arranged on opposite faces and connected to an electrical bias generator 63 which creates an electric field $E_E$ within the body of the plate.

By way of non-limitative example, the plate 6 can be cut from a polycrystalline sample of lead and lanthanum titano zirconate, containing furthermore various metal impurities in particular iron, silver, bismuth and copper. This ceramic is obtained by a calcining operation lasting 4 to 16 hours, and carried out at around 1000° C at a pressure of 250 to 500 kg/cm². The calcined material is cut and then optically polished to obtain discs around 100 microns in thickness and around 1 cm in diameter.

As explained earlier, the alternate light and dark zones constituting the interference pattern, create within the body of the material local electric fields which produce variations of corresponding intensity in double-refracting performance. The fringes pattern is thus recorded in the form of a variable index grating capable of locally modulating the phase of a wave passing through the material.

The system shown in FIG. 2 also makes it possible to read-out the information recorded by the above described method, or in other words by suitably illuminating the plate 6, to cause the image of the object 5 whose recorded fringes constitute the hologram, to appear.

To do this, with the index grating recorded within the body of the plate biased by the generator 63 and the electrodes 61, 62, and with the object beam 11 stopped out, the plate is illuminated by the same beam 12 which was used at the time of recording. The spherical wave emanating from the point $S_2$ is then diffracted by the grating, in the form of a set of waves 13 which seem to emanate from the object 5 and thus form a virtual image thereof, from which image it is always possible, by means of a convergent objective lens for example, to reconstitute a real image if required.

The system of FIG. 2 can be utilised to successively record holograms within the body of one and the same plate. To do this, the previous hologram having been recorded and a new object having been introduced at the point 5, the inclination of the reference beam 12 in relation to the plate is modified, for example by acting upon the beam-splitter 2 and the mirror 30, and a new recording carried out. Each hologram will be separately read-out by giving the reference beam the precise inclination in relation to the plate, which it had at the time of the corresponding recording.

It goes without saying that various other optical means could be utilised in order, from an object, to create a network of interference fringes, without departing from the scope of the invention. It is also possible, for example by discarding the objective lens 41 and the object 5, to cause the spherical waves emanating from two points sources such as $S_1$ and $S_2$ to interfere, and thus to record within the body of the plate 6 a network of fringes constituting a holographic lens. One of the chief novel features of this system in accordance with the invention, resides in the selection of the electro-optical characteristics of the material, combined with the application, by means of the generator 63 and the electrodes 61 and 62, of different electric fields at the times of the recording and read-out.

In accordance with the invention, the material will be chosen in such a way, or utilised under such physical conditions, that its double-refracting property varies in a non-linear manner as a function of the electric field.

A first possible method of obtaining this kind of characteristic is encountered in ferroelectric materials utilised at a temperature in excess of their Curie temperature. The double-refracting property of the material is then a square-law function of the field. For obvious reasons of facility, preferentially materials will be used whose Curie temperature is below the ambient temperature.

In accordance with a first embodiment of the system in accordance with the invention, the fringes are recorded within the body of the materials by utilising phenomena of thermal diffusion alone, and the external field is applied to the plate exclusively during the read-out phase.

Figure 3:
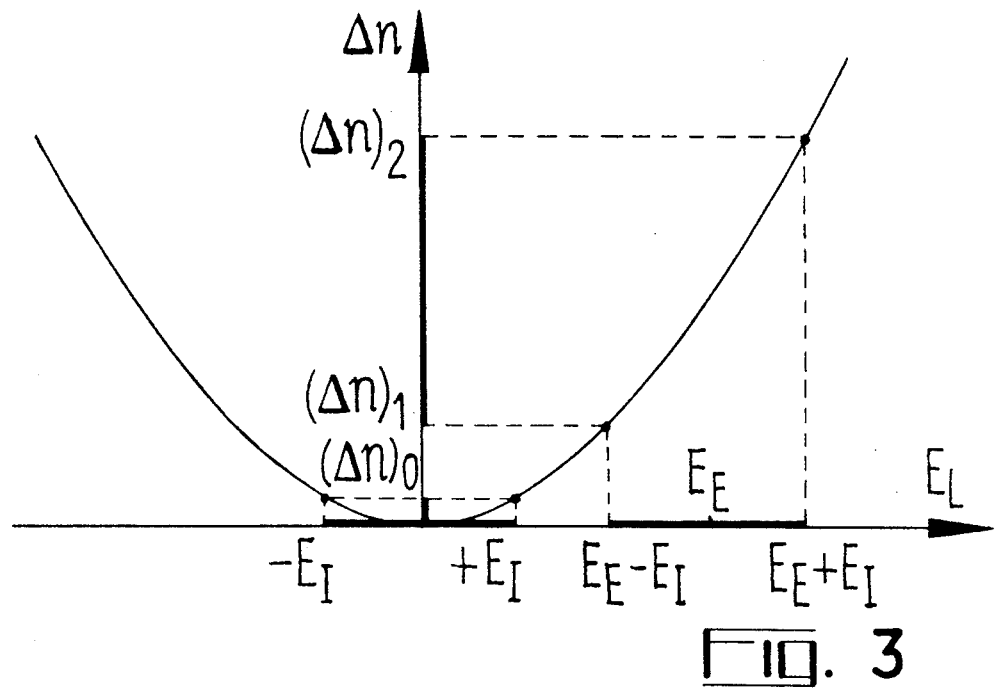

The graph of FIG. 3, which plots the parabolic function representing the variation of the double-refraction property $\Delta n$ (or the difference between the two refractive indices, ordinary and extraordinary) as a function of the local electric field $E_L$ existing within the material, shows the extreme variations of double-refraction which can be achieved during recording and read-out phases.

The spatial variations in illumination, due to the interference fringes, obey a sinusoidal law; the result is the creation, within the body of the material, of an electrid field due to the space charges, whose amplitude varies between $+E_l$ and $-E_l$. This local field causes the material to exhibit a certain degree of double-refraction, the peak value of which is $(\Delta n)_o$, corresponding to the two values $+E_I$ and $-E_I$. The index grating thus created has a periodicity which is double that of the network of interference fringes since the positive and negative values of the field, due to the square-law function, give rise to equal values of double-refraction; moreover, the variation $(\Delta n)_o$ is very small since the system remains in the neighbourhood of the minimum variation of double-refraction as a function of field.

At the time of read-out, an external field $E_F$ is applied to the material as a whole by means of the generator and the electrodes; this external field is superimposed upon the space charge field created by the variations in illumination, and gives a focal field varying from $E_{L1} = E_F - E_I$ to $E_{L2} = E_F + E_I$.

The index grating then acquires a periodicity equal to that of the network of interference fringes utilised to record it. As FIG. 3 shows, the double-refraction varies between the values $(\Delta n)_1$ and $(\Delta n)_2$, which respectively correspond to the values $E_{L1}$ and $E_{L2}$ of the focal field. The amplitude of modulation of the fringes, equal to $(\Delta n)_o$ at the time of recording, has now become $(\Delta n)_2 - (\Delta n)_1$; the modulation gain, substantially equal to twice the ratio of the amplitudes of the external and internal fields, may be considerable. The application of an external field at the time of read-out has the effect of revealing the hologram which was hitherto in the latent state. This system has the advantage that it does not require the application of an electric field during recording. By contrast, as indicated hereinbefore, due to the low mobility of the charge carriers within the ferroelectric materials thus far known, in order to produce holograms of sufficient optical efficiency, either considerable illumination is required at the time of recording, or strong applied fields must be used at the time of read-out.

A second embodiment of the system in accordance with the invention, likewise utilising a ferroelectric material operating at a temperature in excess of its Curie temperature, enables this drawback to be overcome. In accordance with this second embodiment, an external electric field is applied to the material at the time of recording, and the same field is also applied, but with the opposite sign, at the time of read-out.

Figure 4:
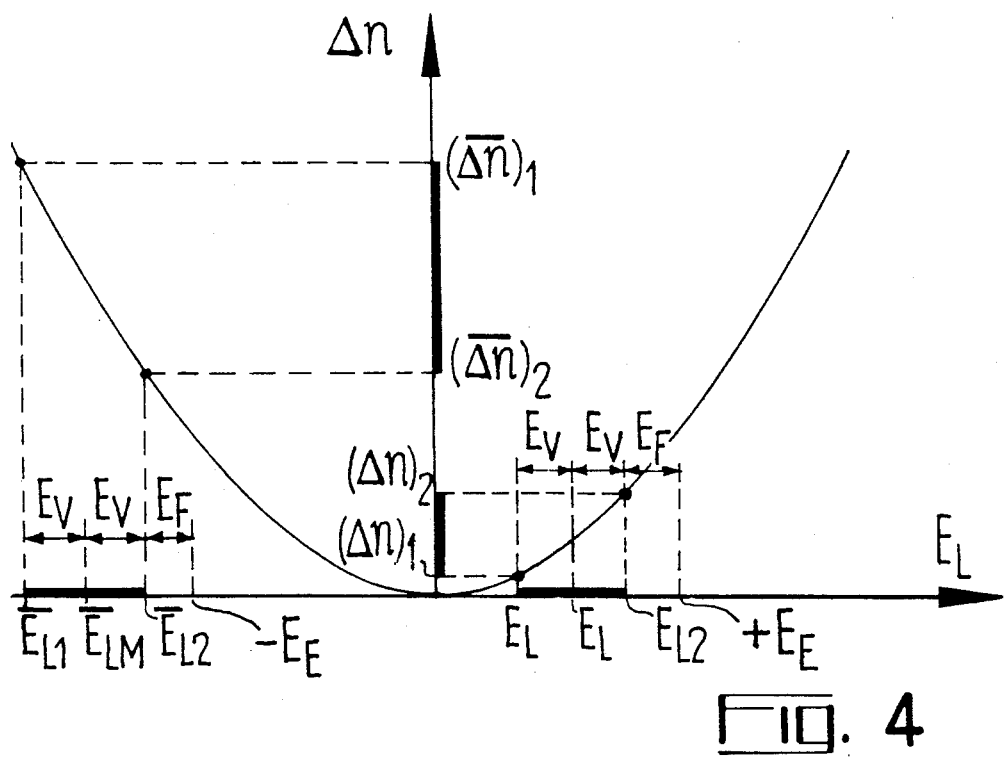

The diagram of FIG. 4, which will also show the parabolic variation of the double-refraction $\Delta n$ as a function of the local electric field $E_L$, illustrates this second embodiment.

At the time of recording, the generator 63 applies to the electrodes 61 and 62 a voltage which creates within the plate an electric field $E_F$. Calculation shows and experience indeed confirms, that when an external electric field is applied to a photo-sensitive electro-optical material, the latter at the same time being subjected to an illumination the intensity of which varies spatially in accordance with a sinusoidal law, there is produced within the body of the material a space charge field of the same periodicity as the illumination, which tends to oppose the external electric field. This space charge field has a fixed component $E_F$ and a component periodically varying in space, of amplitude $E_V$, these respective components being functions of the illumination intensity and of the applied external field $E_F$. The superimposition of the applied external field and the space charge field, results in a local field which oscillates between the extreme values $E_{L1} = E_F - E_F - 2E_V$ and $E_{L2} = E_F - E_F$ around a mean value $E_{LM} = E_F - E_F - E_V$, with the consequence, as FIG. 4 shows, of variations in the double refraction between the corresponding extreme values $(\Delta n)_1$ and $(\Delta n)_2$. The hologram is thus recorded in the material in the form of a refractive grating of the same pitch.

At the time of read-out, the voltage applied to the electrodes, by the generator 63, is reversed; the material is thus subjected to an external electric field $-E_F$. It can then be shown that the space charge field created at the time of recording remains unmodified and is superimposed upon the new applied external field to give a local field oscillating between the extreme values $\overline{E_{L1}} = -E_F - E_F - 2E_V$ and $\overline{E_{L2}} = -E_F - E_F$ about a mean value $\overline{E_{LM}} = -E_F - E_F - E_V$. FIG. 4 shows that the index grating thus oscillates between the extreme values $\overline{(\Delta n)_1}$ and $\overline{(\Delta n)_2}$. By virtue of the square-law relationship existing between the double-refraction phenomenon and the local field, the interval $\overline{(\Delta n)_1} - \overline{(\Delta n)_2}$ is substantially greater than the interval $(\Delta n)_2 - (\Delta n)_1$, and, consequently, the optical efficiency of the hologram is appreciably improved.

Compared with the known systems where the fields applied during recording and read-out phases are identical to one another, the system in accordance with the invention makes it possible, in this second embodiment, to increase the optical efficiency of the hologram without at the same time having to increase the voltage furnished by the generator.

By way of an example to illustrate this state of affairs, by utilising a plate cut from the aforedescribed material, to which a field of 10 kV/cm is applied, it has been possible at the time of read-out, to obtain holograms whose optical efficiency, in the order of 20%, was 6.5 times that obtained at the time of recording.

A third embodiment of the system in accordance with the invention consists in utilising a ferro-electric material at a temperature below its Curie temperature, the material preferably being chosen from amongst those which have a Curie point at a temperature higher than the ambient temperature.

In materials of this kind, small variations in the applied electric field about the value of the coercive field strength, giving rise as they do to a swing in the electric polarization, provoke considerable variations in double-refraction. The result is a second possibility of obtaining a non-linear variation of the double-refraction as a function of the electric field.

Figure 5:
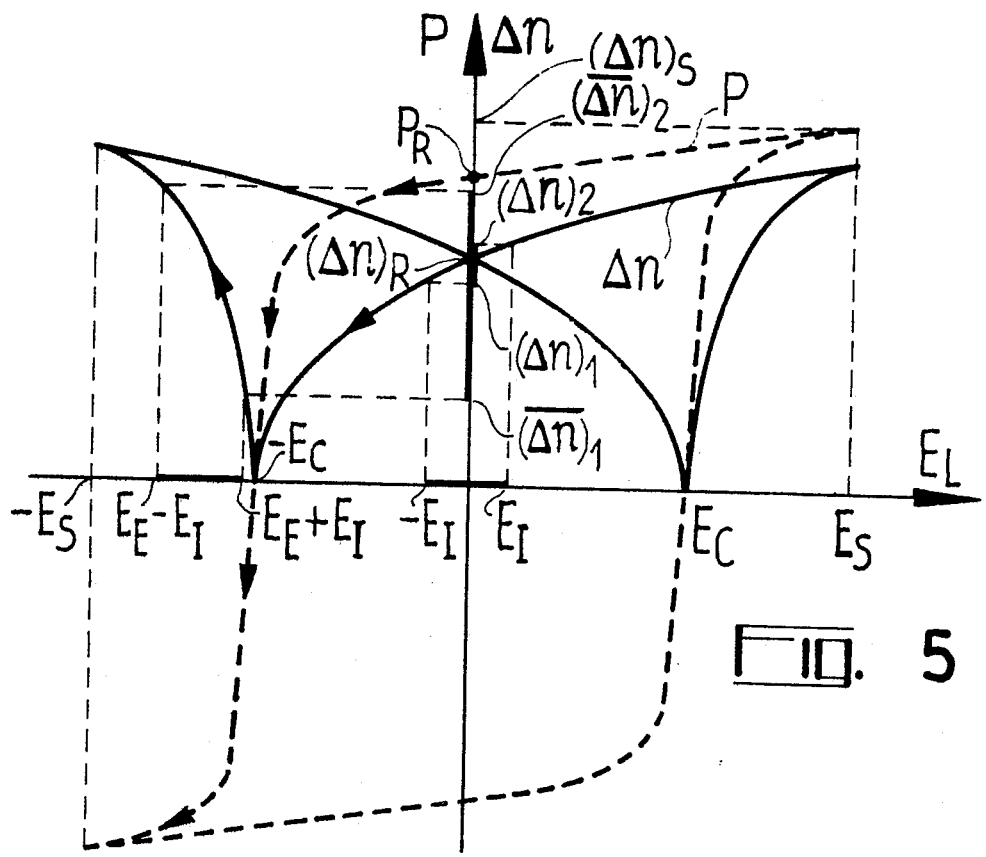
FIGS. 3, 4 and 5 are explanatory diagrams illustrating the operation of different embodiments of the invention.

These properties are summarised by the graphs of FIG. 5 where the corresponding variations, as a function of the local electric field strength $E_L$, in:
the electric polarization (dotted curve);
and in the double-refraction $\Delta n$ (full line curve), can be seen.

The variation in the electric polarization as a function of the electric field, is a classic hysteresis curve. As the field strength is reduced from the saturation level $E_s$ down to 0, and then reversed from 0 to $-E_s$, it is observed that the electric polarization decreases slightly and in a quasi-linear fashion, passing through the remanance or residual polarization value $P_R$ when the field $E_L$ becomes 0, and then changes suddenly, as it changes sign, at the value $-E_c$, corresponding to the coercive field strength. Symmetrical phenomena are observed when the field is increased again from $-E_s$ to $+E_s$.

The variation in double-refraction which accompanies these modifications in the polarization, is manifested by the so-called "butterfly wing" curve. The double-refraction decreases slightly beyond the value $(\Delta n)_s$ corresponding to $E_s$ passing through the value $(\Delta n)_R$ corresponding to $P_R$; in the neighbourhood of the coercive field strength, the double-refraction decreases radically, disappears when the field strength reaches the value of the field strength, and experiences a sharp rise beyond that point.

FIG. 5 also shows how this third embodiment of the system operates.

At the time of recording, the interference fringes can be recorded without any application of external field; indeed, the residual polarization $P_R$ causes the charge carriers to migrate. The space charges create a local field oscillating between $-E_I$ and $+E_I$; an index grating, oscillating from $\Delta n_1$ to $\Delta n_2$, is recorded in the material; the interval $\Delta n_2 - \Delta n_1$ is very because of the low slope of the curve $\Delta n = f(E_L)$ in the neighbourhood of $E_L = 0$, so that the recorded hologram has a low optical efficiency.

At the time of the read-out phase, the reference beam illuminating the material at this juncture, the voltage applied to the electrodes is made to change very rapidly so that the external field $E_E$ to which the material is subjected, changes from a value 0 to a value equal to the saturation field strength. This variation must be sufficiently rapid and the field created sufficiently strong, to prevent the space charge field from creating a domain structure.

The sign of the applied electric field will depend upon the direction of the residual polarization at the time of recording. In the example shown in FIG. 5, where the residual polarization at the time of recording was $+P_R$, a field strength $-E_s$ will be applied. The electrical polarization and double-refraction describe the respective graphs in the directions of the arrows. The local electric field existing within the material varies between the extreme values $E_{L1} = E_E + E_I$ and $E_{L2} = E_E - E_I$, and gives rise to the appearance of double-refraction variations ranging from $\overline{(\Delta n)_2}$ to $\overline{(\Delta n)_1}$. The interval $\overline{(\Delta n)_2} - \overline{(\Delta n)_1}$ between these two values is proportional to the slope of the curve $\Delta n = f(E_L)$. As FIG. 5 shows, it reaches its maximum value as soon as the local field $E_{L1} = E_E + E_I$ becomes equal to the coercive field strength $-E_c$. Thus, during the brief instant at which the external field $E_E$ passes from the value $-(E_c + E_I)$ to the value $-(E_s - E_I)$, the extreme interval between the indices of the recorded index grating constituting the hologram, which interval is very small at the time of recording, passes through a value which is higher the steeper the slope of the curve $\Delta n = f(E_L)$. During a very short period of time, the hologram thus exhibits an extremely high efficiency; it has been experimentally confirmed that it would be possible, using this kind of system, to multiply the hologram efficiency by a factor in the order of 100.

In the three embodiments thereinbefore described, the reference light beam used to read-out the image uniformly illuminates the photosensitive material and, because of this fact, tends to erase the recording index grating. Experience nevertheless shows that as a consequence of a phenomenon which is as yet improperly understood, illumination levels of a very great deal higher intensity are required to erase the index grating than are required to record it. One and the same holograms can thus be read-out for a period of time approximately equal to ten times the time taken to record it, whilst conserving satisfactory optical efficiency.

What we claim is:

1. Holographic system for recording and reading out, within the volume of a photosensitive electro-optical material, an optical grating; said optical grating being constituted by refractive index variations of said material and presenting an electrically variable optical efficiency; the operation of said system including a recording phase and a read-out phase and said system comprising:

optical means for producing, during said recording phase, photo-excitation of said material by at least one interference fringes pattern and for illuminating, during said read-out phase, said material by a monochromatic light beam;

bias means for applying a variable electric D.C. field; said photoexcitation of said material generating said index variations thereof, said fringes pattern thus constituting said optical grating;

said material exhibiting a non-linear relationship between the values of its double refracting property and of the local electric field;

said variable electric field controlling said refractive index variations and having one recording value during said recording phase and at least one read-out value during said read-out phase, and at least one said read-out value being distinct from said recording value and from any value included between said recording value and the inverse of said recording value.

2. A system as claimed in claim 1, wherein said material has the shape of a plate, said bias means including at least one set of two electrodes arranged on each side of said plate and an electrical generator for exciting said electrodes.

3. A system as claimed in claim 1, wherein said material being a ferro-electric material, said ferro-electric material having a Curie temperature $T_c$, and the temperature T of said material in said system, during the operation thereof, being higher than $T_c$, said non-linear relationship is an approximately square law function of the electric field.

4. A system as claimed in claim 3, wherein said recording value is a null value.

5. A system as claimed in claim 3, wherein said recording value and said read-out value have the same absolute value but opposite signs.

6. A system as claimed in claim 1, wherein said material being a ferro-electric material, said ferro-electric material having a Curie temperature $T'_c$, and the temperature $T'$ of said material in said system, during the operation thereof, being lower than $T'_c$, said material has a non-null residual polarization during said recording phase; said bias means applying an electric field pulse to said material during said read-out phase, said electric field pulse having a direction opposite to said residual polarization.

* * * * *